D. N. B. Coffin, Jr., & I. D. Spaulding,
Capstan.
No. 2,558. Reissued Apr. 16, 1867.
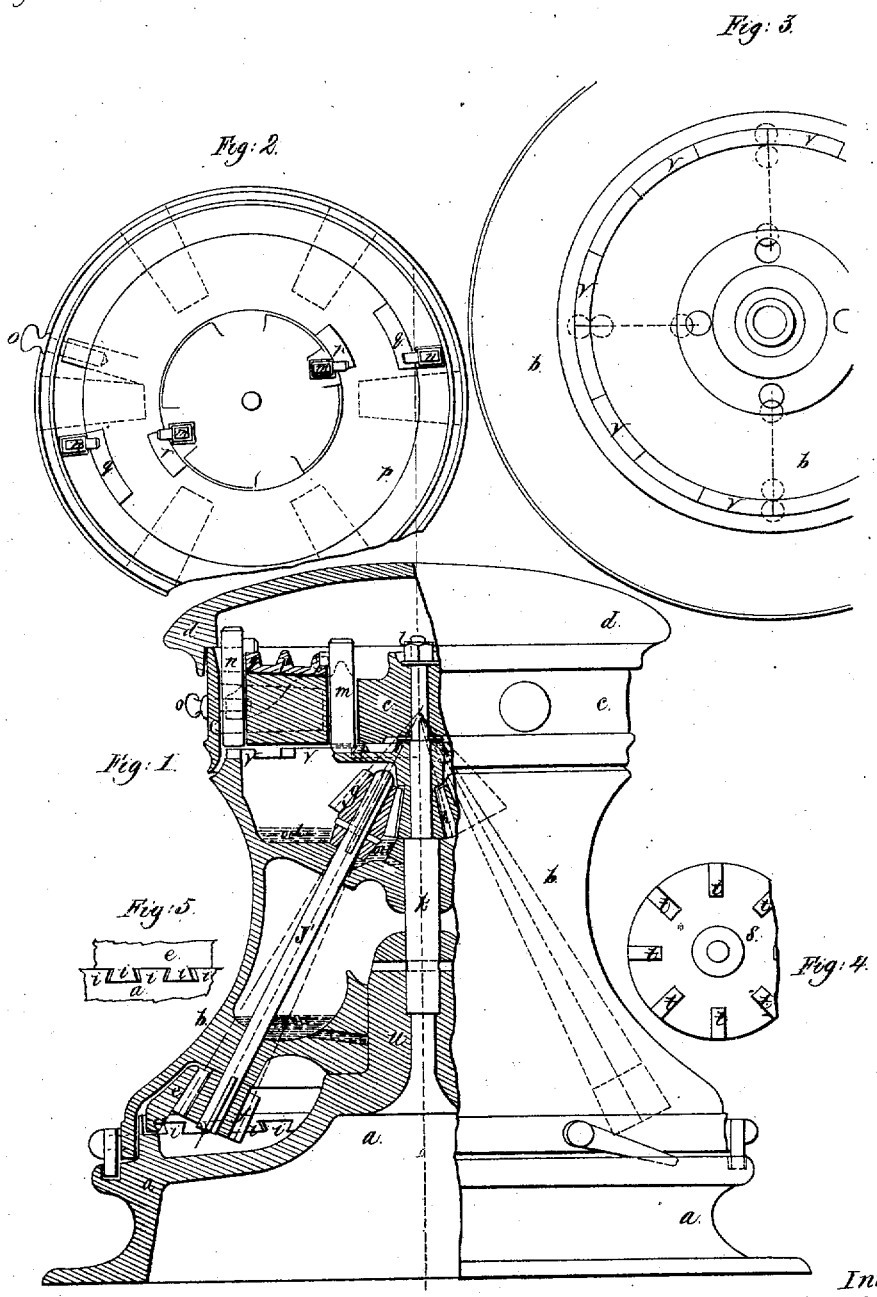
Witnesses:
E. H. Coffin
Lorenzo B. Moulton
Inventors:
D. N. B. Coffin Jr.
Isaac D. Spaulding
AM. PHOTO-LITHO. CO. N.Y. (OSBORNE'S PROCESS)

United States Patent Office.

DAVID N. B. COFFIN, JR., AND IRAH D. SPAULDING, OF BOSTON, MASSACHUSETTS, ASSIGNEES OF D. N. B. COFFIN, JR.

DIVISION I.

*Letters Patent No.* 51,107, *dated November* 21, 1865; *reissue No.* 2,558, *dated April* 16, 1867.

IMPROVED POWER CAPSTAN.

The Schedule referred to in these Letters Patent and making part of the same.

TO ALL WHOM IT MAY CONCERN:

Be it known that D. N. B. COFFIN, Jr., of Boston, in the county of Suffolk, (formerly of Brookline,) and Newton, in the county of Middlesex, did invent certain new and useful Improvements in Capstans, of which the following is a full and exact description, reference being had to the accompanying copy of the original drawings, and unimportant added illustration, and to the letters of reference marked thereon.

The nature of the invention relates to improvement in the method of gearing and other peculiarities of construction. With reference to the accompanying drawings—

Figure 1 is a sectional elevation, and Figure 5 also.

Figure 2 is a plan of the lever-head, &c.

Figure 3 is a plan of the capstan-barrel or windlass.

Figure 4 is a plan of a flange or clutch cast in one piece with gear *h*, as shown in the drawings, or otherwise secured to it.

Like letters of reference indicate the same or like parts in all the figures.

*a* is the bed-plate. This plate is cast in one piece with the lower portion of the spindle or centre shaft. The spindle or shaft part *u* forms the lower journal for the capstan-barrel *b*, and is cast hollow, as shown in the drawing. The lighter upper portion of the spindle is made of wrought or other metal, of suitable toughness. A pin or a nut is applied to the upper portion of the spindle, near the top, to hold the revolving parts down. The upper wrought portion of the spindle may be inserted when the lower part is cast, or afterwards, in any of the modes common to the art in similar cases. The bed-plate *a* is furnished with the usual pockets for the pawls on the barrel, and also with inclined faced lugs *i*. These lugs have faces in opposite directions for operation in both directions. A conical or taper internal gear, *e*, is furnished on its under side with corresponding inclined faced lugs, also having faces in two opposite directions, and corresponding to lugs *i* on the bed-plate, the spaces between them being at least sufficient to allow the free interlocking with those on the bed-plate. When force is applied tending to rotate gear *e* in either direction, the inclined faces of the lugs cause it to be held closely (stationary) to the bed-plate. It is, nevertheless, free at all times when the capstan is taken apart to be lifted off. A series of conical or taper gears, *f*, play into the gear *e* as a fulcrum. Gears *f* are fast to the lower or outer ends of shafts *j*, by casting on or otherwise. To the upper or inner ends of shafts *j* are fastened the gears *g* by means of a feather and a pin, or otherwise. The shafts *j* are arranged at an angle in relation to the axis of the centre gear and the capstan. The extent of the angle will be determined by the advantage required in the employment of the gears. The more the angle is distended the larger the fulcrum gear, and the greater the advantage to and by the gears in overcoming resistance at the expense of time, while, as the angle is lessened, the fulcrum gear is reduced, and the less the advantage to and by the gears in overcoming resistance. Gear *h* plays into gears *g*, and turns freely upon the centre shaft or spindle. The lever-head *c* is furnished with lever pockets, and turns freely upon the centre shaft or spindle, and rests upon a suitable shoulder thereon, so as not to bear on the parts connected to gear *h*. In the lever-head is arranged a series of lifting inclines and locking-bolts for connecting and disconnecting the lever-head to and from the capstan-barrel, directly and indirectly, for power through gear *h*, &c.

When the parts are made and the capstan is to be put together, the shaft *j*, with gears *e f g* and *h*, are adjusted in their proper places and relations within the capstan-barrel, substantially as shown, and the whole is then slipped on to the centre shaft or spindle *u k*. The lever-head is then furnished with the parts belonging thereto and slipped down upon the spindle, after which the nut *v*, or a pin, is applied to the top of the spindle, and the lever-head and barrel are thereby secured down. When the capstan is to be used as a simple capstan with the simple handspike purchase, the inclined lifters are made to let the bolts *n* into connection with lugs V on the barrel, and throw out of connection the bolts and lugs *m t*, and the reverse when the advantage of the gears is required. This capstan or windlass always rotates in the direction of the movement of the handspikes, so that it can always be operated either backward or forward with equal facility by simply reversing the direction of movement with the handspikes, and directing the barrel-pawls accordingly. The gears, with the exception of the fulcrum gear, rotates freely when the simple capstan is used, but do not otherwise act, except when the power arrangement is used. The number each of bolts *n* and *m* may be varied from one upwards, and so with respect to shaft *j* and its gears. Strength is gained with the increase in number. Three each is probably best. The angular, conical, or taper method of gearing affords abundance of space for the massive cast hollow spindle formed in one with the bed-plate. The advantages incidentally arising from the taper form of gearing are very great, not the least of which is the facility of drawing from the sand in moulding, which insures splendid castings in point of smoothness and accurate form.

Having described the invention, what we claim, and desire to secure by Letters Patent, is as follows:

1. We claim the conical or taper gears *h g f e*, and the angular shafts *j*, in combination with the barrel of a capstan, substantially as described.

2. Connecting the fulcrum-gear *e* to the bed-plate automatically, by furnishing each with a series of inclined faced lugs, substantially as described.

3. Duplicating the inclined faces of the lugs *i* on the fulcrum gear and the bed-plate in reverse order, so as to operate both ways.

D. N. B. COFFIN, JR.,
IRAH D. SPAULDING.

Witnesses:
E. H. COFFIN,
LORENZO. G. MOULTON.